US009185517B2

(12) United States Patent
Kuhl et al.

(10) Patent No.: US 9,185,517 B2
(45) Date of Patent: Nov. 10, 2015

(54) LONG-LIFE ASSET TRACKING (71) Applicant: Trimble Navigation Limited, Sunnyvale, CA (US)

(72) Inventors: Mark Kuhl, Santa Clara, CA (US); John F. Cameron, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 116 days.

(21) Appl. No.: 14/070,281

(22) Filed: Nov. 1, 2013

(65) Prior Publication Data

US 2015/0126214 A1 May 7, 2015

(51) Int. Cl.
*H04W 24/00* (2009.01)
*H04W 4/02* (2009.01)
*G01S 19/34* (2010.01)
*G01S 19/48* (2010.01)

(52) U.S. Cl.
CPC ............... *H04W 4/02* (2013.01); *G01S 19/34* (2013.01); *G01S 19/48* (2013.01)

(58) Field of Classification Search
CPC ....... H04W 4/02; H04W 4/028; H04W 64/00; H04W 4/021; H04W 4/008; H04W 84/18; H04W 12/12; H04W 4/005; H04W 4/14; H04W 52/0261; H04W 88/06; H04W 4/043; G06Q 10/087; G06Q 10/08; G06Q 10/0833; G01S 5/0027; G01S 5/02; G01S 19/13; G01S 1/68; G01S 19/48; G01S 5/0294; G01S 5/0009; G01S 19/39; G01S 19/16; G01S 19/34; G08G 1/205
USPC ............. 455/456.1, 456.2, 456.3, 574, 404.2, 455/410, 466, 414.1, 457, 67.11; 705/28, 705/14.58, 333; 340/539.13, 572.1, 8.1
See application file for complete search history.

(56) References Cited

U.S. PATENT DOCUMENTS

| 6,236,359 | B1 | 5/2001 | Watters et al. | |
|---|---|---|---|---|
| 7,528,721 | B2 | 5/2009 | Levin et al. | |
| 8,026,814 | B1 | 9/2011 | Heinze et al. | |
| 8,131,465 | B2 | 3/2012 | Eitan et al. | |
| 8,193,915 | B2 * | 6/2012 | McCall et al. | 340/10.34 |
| 2008/0042838 | A1 * | 2/2008 | Levin et al. | 340/572.1 |
| 2009/0153401 | A1 | 6/2009 | Eitan et al. | |
| 2010/0039284 | A1 | 2/2010 | Hall et al. | |
| 2011/0035284 | A1 * | 2/2011 | Moshfeghi | 705/14.58 |
| 2011/0060652 | A1 * | 3/2011 | Morton | 705/14.58 |
| 2011/0133888 | A1 | 6/2011 | Stevens et al. | |
| 2013/0060351 | A1 * | 3/2013 | Imming et al. | 700/13 |
| 2013/0325856 | A1 * | 12/2013 | Matamala et al. | 707/724 |
| 2014/0179341 | A1 * | 6/2014 | Sydir et al. | 455/456.1 |

FOREIGN PATENT DOCUMENTS

GB 2485787 A 5/2012

* cited by examiner

*Primary Examiner* — Fred Casca (57) ABSTRACT

A method and system for long-life asset tracking is disclosed. One example utilizes an activation module to provide an activation signal to at least a portion of the long-life asset tracker. A position determiner receives the activation signal and determines a location of the long-life asset tracker with a first level of accuracy or a second level of accuracy, wherein the second level of accuracy is more accurate than the first level of accuracy and wherein a default mode of operation is to utilize a radio locator for position determination instead of a navigation satellite system module to extend the life of a power source of the long-life asset tracker. An information provider module to broadcast the location of the long-life asset tracker is also disclosed.

7 Claims, 6 Drawing Sheets

Receives an activation signal, the signal requesting the long-life asset tracker coupled with the low mobility asset to activate at least a portion of a position determination system.
302

↓

A radio locator module providing location information at a first level of accuracy.
303

↓

A navigation satellite system (NSS) module providing location information at a second level of accuracy, wherein the second level of accuracy is more accurate than the first level of accuracy, the NSS module consuming more power in operation to determine the location of the long-life asset tracker than is consumed by the radio locator module.
304

↓

Defaults to the radio locator module to perform position determination without utilizing the NSS module to extend the life of a power source of the long-life asset tracker.
306

↓

Broadcasts the location of the long-life asset tracker with the first level of accuracy unless a condition has been met to utilize the NSS module and broadcast the location of the long-live asset tracker at the second level of accuracy.
308

LONG-LIFE ASSET TRACKING

BACKGROUND

Asset tracking is an increasingly important item in many business models. For example, asset tracking can include real-time municipal vehicle tracking, anti-theft devices on clothing, and the like. Asset tracking can be passive or active devices. When active, the asset tracker must have a reliable power source; for example, a vehicle with asset tracking will have the asset tracker wired into the vehicles electrical system to provide the necessary power. Similarly, an active asset tracker may be plugged into a power grid or the like.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "performing", "determining", "outputting", "inputting", "providing", "receiving", "utilizing", "broadcasting", "consuming" or the like, often refer to the actions and processes of an electronic computing device/system, such as a mobile phone, an electronic personal display, and/or a mobile (i.e., handheld) multimedia device, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Figure 1:
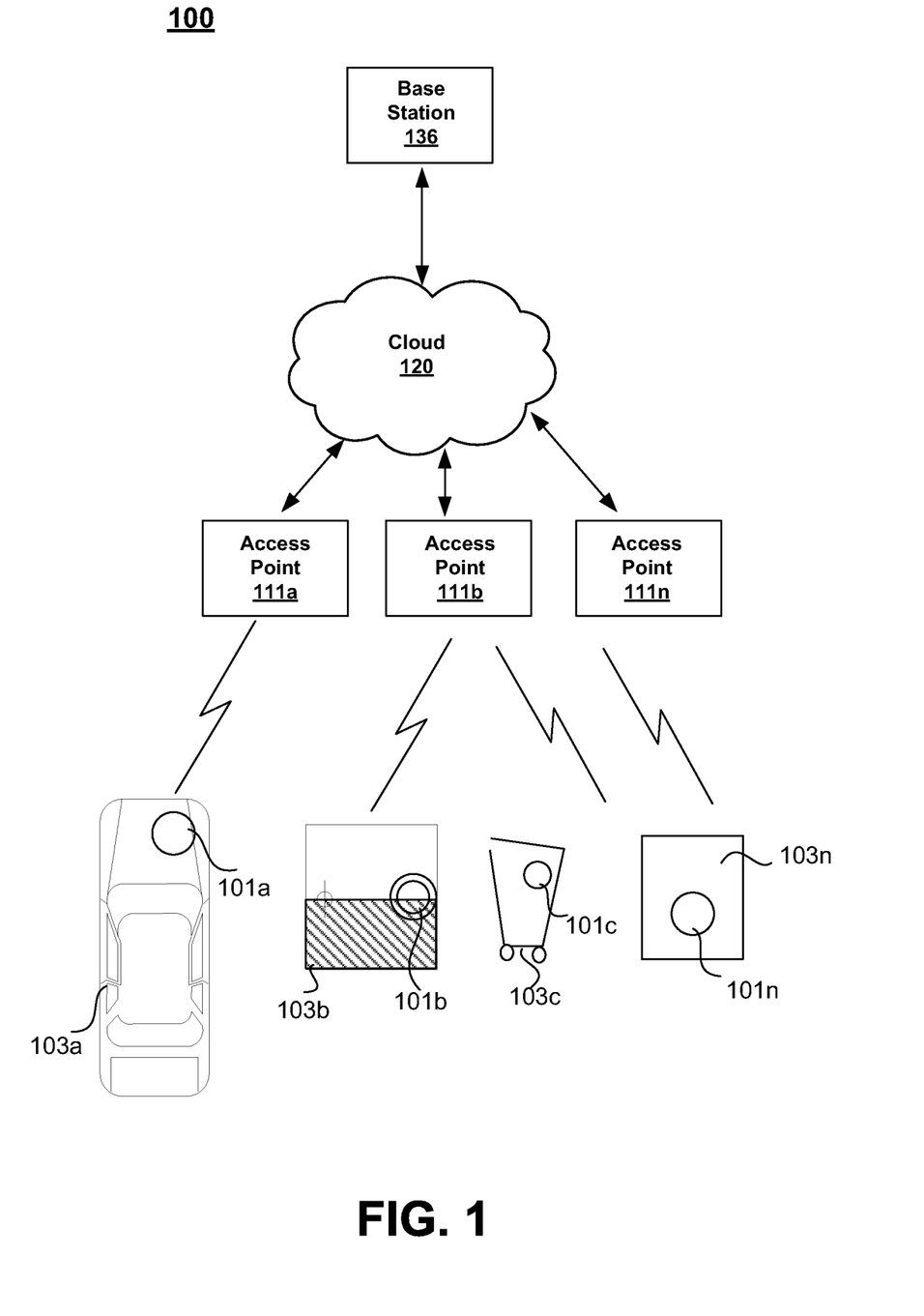
FIG. 1 shows a long-life low mobility asset tracking system, according to various embodiments.

With reference now to FIG. 1, a long-life asset tracking system 100 is shown in accordance with various embodiments. In one embodiment, long-life asset tracking system 100 includes a long-life asset tracker 101 (101a-101n) coupled with a low mobility asset 103. Long-life asset tracking system 100 also includes an access point 111 (111a, 111b, ... 111n) and a base station 136. In one embodiment, base station 136 communicates with access point 111a-111n via the Cloud 120 (e.g., the Internet, an intranet, or other real-time communications network).

In FIG. 1, long-life asset tracking system 100 comprises a plurality of long-life asset trackers 101a-101n which are each communicatively coupleable with any or all of access point 111 (e.g., 111a-111n). In general, a long-life asset tracker 101 is configured to collect asset information such as location and other metrics, and broadcast that information to any access point 111 within range. In one embodiment, the information is passed wirelessly and in another embodiment, long-life asset trackers 101, such as 101a-101n, may have a wired connection with one or more access point 111 (e.g., 111a-111n).

In one embodiment, a long-life asset tracker 101 (e.g., 101a-101n) conveys asset information wirelessly using an Industrial, Scientific, and Medical (ISM) radio transceiver which operates in the 902-928 megahertz (MHz) frequency range.

In one embodiment, access point 111a-111n is configured to receive and store asset information from one or more of long-life asset trackers 101a-101n and to forward that data to base station 136. In accordance with various embodiments, access point 111a-111n utilizes an ISM transceiver for receiving asset information from long-life asset trackers 101a-101n. In one embodiment, access points 111a-111n utilize a wireless transceiver for conveying asset information to base station 136, or to other devices which are authorized to communicate with access point 111a-111n. It is noted that access point 111a-111n are not limited to wireless communications alone when communicating with base station 136. For example, access point 111a-111n can also be configured with a wired communication interface such as an Ethernet cable, fiber-optic cable, or the like to convey asset information to base station 136 via a wired communication link. Additionally, access point 111a-111n can utilize a mobile communications device to convey asset information to base station 136 via a mobile communications network. In one embodiment, the access point includes multiple antenna inputs which may be used for diversity and/or beam forming. In one embodiment, one or more of access point 111a-111n are battery powered. However, in another embodiment, one or more of access point 111a-111n are not battery powered but is instead coupled with an outside power source.

In one embodiment, the long-life asset tracker 101 determines and broadcasts information about the low mobility asset 103. Each of access point 111a-access point 111n is configured to send information to the long-life asset tracker 101a-101n and receive information from the long-life asset tracker 101a-101n.

Figure 2:
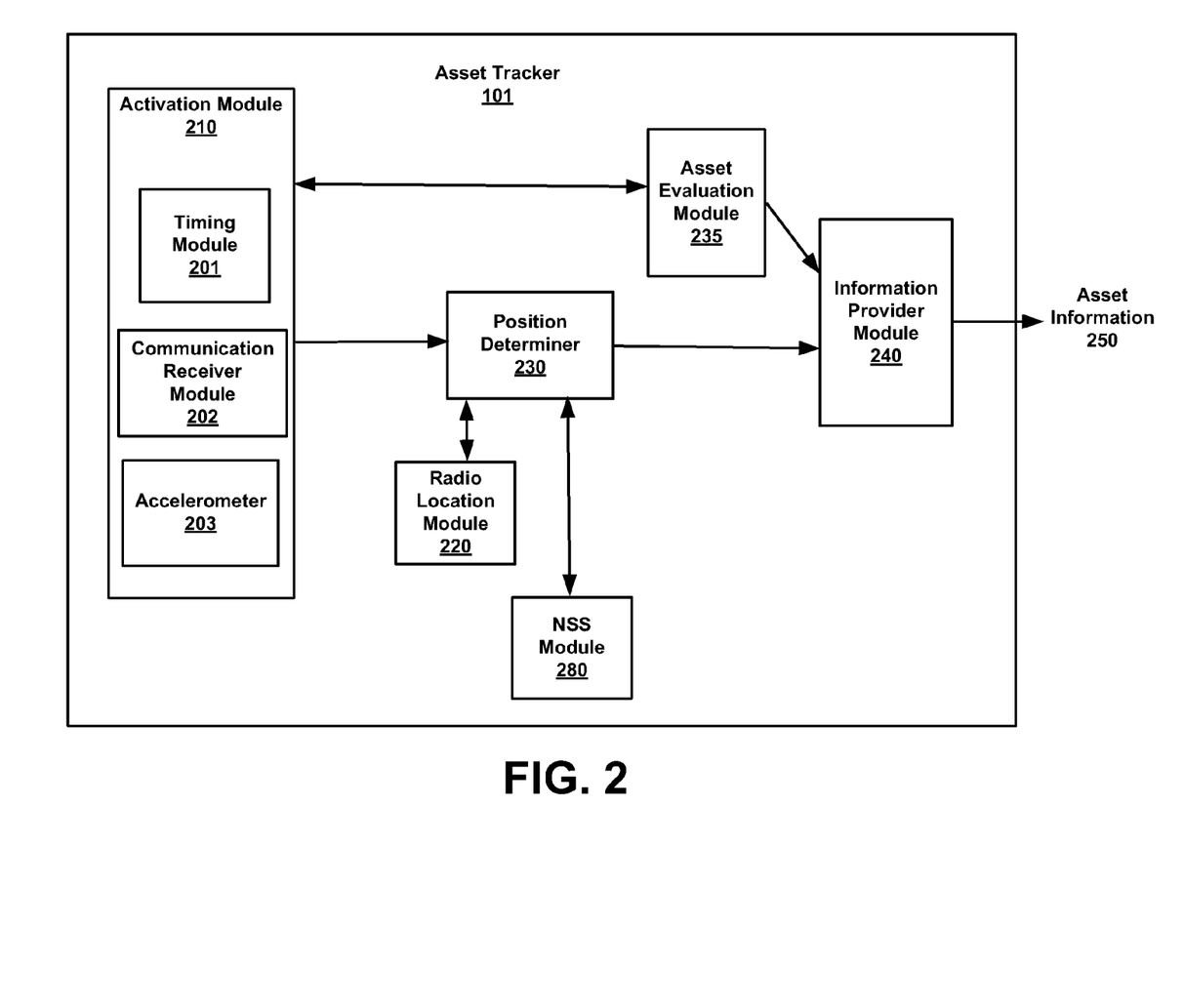
FIG. 2 illustrates a long-life asset tracker for a low mobility asset, according to various embodiments.

Although a number of long-life asset tracker 101*a*-101*n* are shown, the technology is well suited to utilizing one or more long-life asset tracker 101 as described in further detail in FIG. 2. The use of four long-life asset tracker 101*a*-101*n* herein is merely for purposes of clarity. Similarly, although 2 access points 111*a*-111*n* are shown, the technology is well suited to utilizing one or more access points 111. The use of two access points 111*a* and 111*b* herein is merely for purposes of clarity. Although a number of access points and long-life asset trackers are shown, for purposes of clarity, in the following discussion, access points 111*a*-111*n* will be referred to herein as access point 111. Similarly, long-life asset tracker 101*a*-101*n* and low mobility asset 103*a*-103*n* will be referred to herein as long-life asset tracker 101 and low mobility asset 103 respectively.

Base station 136 is configured to receive the asset location information provided by long-life asset tracker 101 via access point 111 and utilize the asset location information to determine if the asset is in a properly prescribed location.

In the present discussion, the term low-mobility asset is used to describe an object that is, or may be, mobile but is not often mobilized; as opposed to a fixed object or a significantly mobile object. For example, a fixed object would be akin to a telephone pole that is sunk into the ground and placed into use. Once the telephone pole is affixed into the ground, it is expected to remain in the same location. It is not likely that the telephone pole would be moved across a road, or down a street. Conversely, an example of a significantly mobile object would be a user's daily commuter car. The car is stationary at times and mobile at other times. If it were checked on throughout the day, it would not be uncommon to find the user's daily commuter car in a number of different locations.

However, in the present discussion, a low-mobility object refers to an object that can be, but is not normally, moved. One example of a low-mobility object is a trash bin, such as trash bin 103*c*. In general, a trash bin remains in a fixed location except for a few hours each week when it is moved to the curb. Other than trash day, it would be uncommon to find a trash bin moved from its normal storage location. Another example of a low-mobility asset would be a railcar, such as railcar 103*n*, that was parked in the train yard. When a railcar is in the yard, it is generally expected to remain stationary. If the railcar was used once a week, then other than the time of use, the railcar would be stored in the same location within the train yard. Similarly, a new car, such as car 103*a*, in a car yard, e.g., awaiting delivery to a dealer, would generally be expected to remain stationary.

Another example of a low mobility object may be a float, such as float in a well or in a container, such as long-life asset tracker 101*b* shown in fluid storage container 103*b*. For example, the float may indicate a fluid level of a storage tank, of a groundwater well, and the like. Depending upon the use and size of the fluid being measured, the fluid level does not significantly change over the range of a day or even a week or month. For example, a groundwater well does not fill up or empty out over a period of a few hours. However, slowly, over a period of weeks, months or even years, the water level may increase or decrease. Similarly, a fluid storage container may be used to store a liquid. The storage tank may be emptied out or filled up on a weekly, monthly or longer time period. Thus, by knowing when the tank is 80% full or 75% empty, for example, the tank could be refilled or drained as appropriate.

In another example, the tank may be a commercial or residential septic tank and the low mobility asset may be floating therein. In this case, the long-life asset tracker may be placed in the septic tank and may monitor the level of the fluid in the tank. In so doing, the tank may be monitored for leaks, or fullness. Moreover, in most residential septic tanks, there is no power source associated therewith and as such, the asset tracker would need to have its own power source. By utilizing the long-life technology described herein, the tank could be monitored for a 5-20 year period without requiring a change to the batteries of the asset tracker. Additionally, the asset tracker could be pre-programmed to provide an alarm or indicator if the fluid level reached a "time to drain" level.

Referring now to FIG. 2, a block diagram of long-life asset tracker 101 for low mobility asset 103 is shown in accordance with various embodiments. In one embodiment long-life asset tracker 101 includes an activation module 210, a position determiner 230, an asset evaluation module 235 and an information provider module 240. In addition, long-life asset tracker 101 includes a radio location module 220 and an NSS module 280. Asset tracker outputs asset information which may include one or more of location information and an operational metric associated with an asset to which long-life asset tracker 101 is coupled.

Activation module 210 provides an activation signal to at least a portion of the long-life asset tracker coupled with the low mobility asset. In one embodiment, activation module 210 may include one or more activation signal generating devices such as: timing module 201, communication receiver module 202 and accelerometer 203. In one embodiment, communication receiver module 202 is utilized to receive a command broadcast containing the activation signal from access point 111 of FIG. 1. Timing module 201 generates a command to provide the activation signal for the low mobility asset 103 at a predefined time, which may be a recurring predefined time interval or a predefined time on a predefined date. Accelerometer 203 generates a command to provide the activation signal when motion is detected (this may be any detection of motion, or detection of motion that exceeds a predetermined threshold of movement or detection of motion that occurs for longer than of a predetermined amount of time).

Position determiner 230 utilizes radio location module 220 to perform a location determination for the long-life asset tracker at a first level of accuracy. In the following discussion, the first level of accuracy may be 10 meters of accuracy, at least 5 meters of accuracy, or the like. In one embodiment, the signal utilizes 902-928 MHz frequency range on a single frequency channel. In addition, the signal may include features such as, non-coherent frequency shift keying (FSK) modulation, 128-bit advanced encryption standard (AES) encryption for data security, and a programmable data rate that can be programmed from 25 bits per second (bps) to 250 kilobits per second (kbps). In so doing, the signal may have a range of up to 5 miles depending on the environment.

To provide power savings, the transmission power may also be programmable such as within a range from 0.1 to 1 W. For example, radio location module 220 sends out a signal with a range that can be adjusted dependent upon the concentration of a plurality of access points within a given area. For example, if the radio location module 220 is in a car yard, the signal may be a lower powered signal that is only received by any access points within 500 meters of the radio location module. However, if the radio location module is in a trash bin in a neighborhood, the signal may need to be higher powered to reach an appropriate number of access points spread out across a neighborhood.

In general, to find position with radio location module 220 a number of access points are pinged by the radio location module 220. Since the access points are in a known location the feedback from the access point 111 signal will include a range and an access point identifier. Although any number of access points may be pinged, the more access points that respond, the better the level of accuracy of the location determination.

In one embodiment, when the signal from radio location module 220 is received at an access point, the access point 111 will provide a response signal that will include an access point identifier and/or access point 111 location information. In addition, either or both the signal sent from radio location module 220 or access point 111 will include time information. By utilizing the time information (e.g., signal travel time) in conjunction with the location information of the access point 111 provided in the signal, a range circle can be determined. When a second access point signal is received, a second range circle is also determined. The intersection of the circles will provide an estimated position. Thus, as the number of responding access points increases, the intersection point of the circles will become more defined and as such, the estimated position will gain accuracy. In one embodiment, when four or more access points respond, the position can be resolved with an accuracy of less than 5 meters.

In another embodiment, instead of replying to the signal sent from radio location module 220, the signal from radio location module 220 will include time information and an identifier for the long-life asset tracker 101. Each access point that receives the signal will forward the signal's time information and long-life asset tracker 101 identification information to base station 136. As the information is received from a number of access points, base station 136 will be able to perform a similar range circle analysis to determine the location of long-life asset tracker 101. That is, base station 136 is able to receive the information about the asset provided by the long-life asset tracker 101 via the plurality of access points and utilize the information about low mobility asset 103 to manage low mobility asset 103.

However, if additional accuracy is desired, position determiner 230 will activate NSS module 280 to provide a position with a second level of accuracy that is more accurate than the first level of accuracy. In general, the second level of accuracy is a sub-meter accuracy. The NSS module 280 consumes more power in its operation to provide a location determination at the second level of accuracy than the radio location module consumes in its operation to provide a location determination at the first level of accuracy. In one embodiment, position determiner 230 will not power up NSS module 280 without a specific command. Instead, a default mode of operation is to utilize the radio locator for position determination instead of the NSS module in order to extend the life of a power source of the long-life asset tracker. In other words, position determiner 230 will default to the location information provided by radio location module 220 without powering up NSS module 280. By defaulting to radio location module 220 and only activating NSS module 280 when a specific request is received, position determiner 230 will be able to provide significant power savings to long-life asset tracker 101. Since an NSS module consumes more power than the radio location module 220, the significant power savings will allow long-life asset tracker 101 to operate on from its own power source (e.g., battery, battery/solar, capacitor) for a long duration of time such as, 5 years, 10 years, 20 years or longer depending upon the provided power source.

When radio location module 220 is used, information provider module 240 (which is an RF transmitter or transceiver) broadcasts the location of long-life asset tracker 101 with the first level of accuracy. In addition, when NSS module 280 is utilized, information provider module 240 will also broadcast the location of long-life asset tracker 101 with the second level of accuracy. In addition to providing location information, information provider module 240 may provide asset information 250 such as, a fluid level, leak information, times of movement, and the like.

Figure 3:
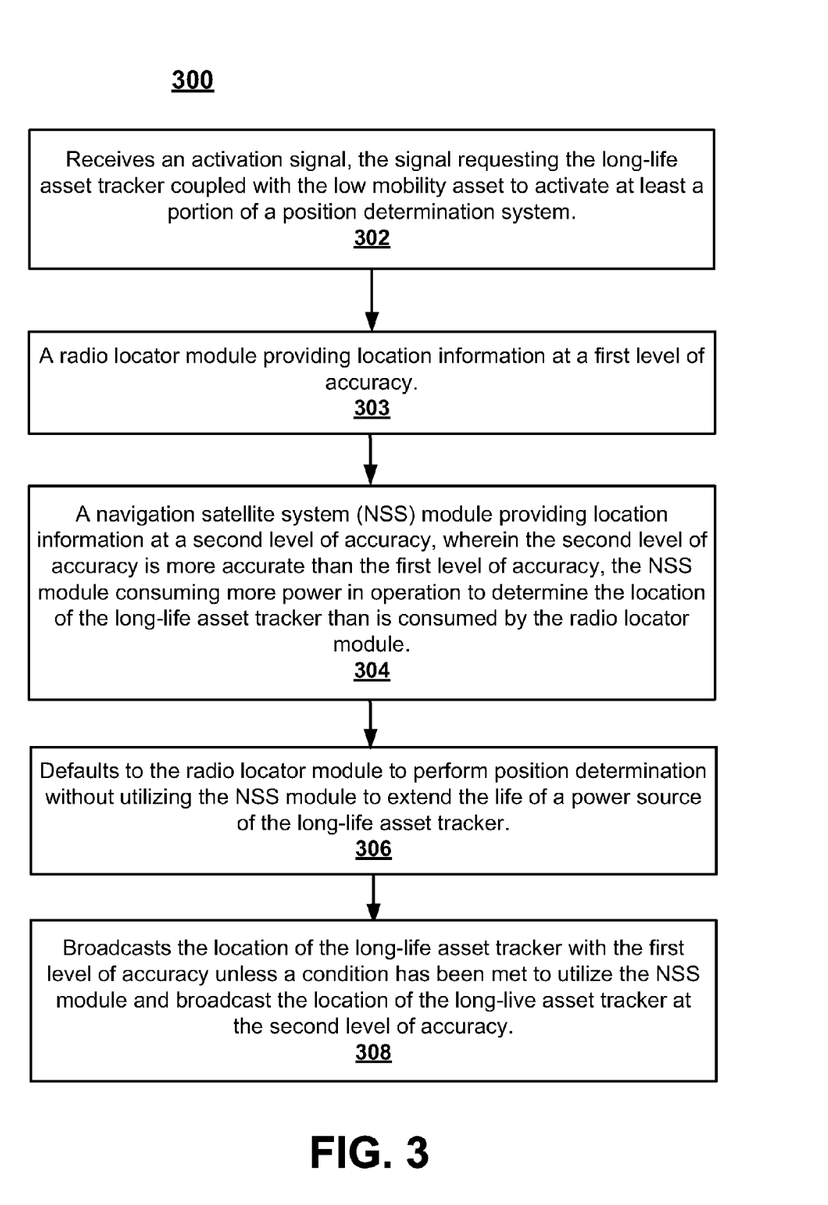
FIG. 3 illustrates a flow diagram of a method for utilizing a long-life asset tracker for tracking a low mobility asset, according to various embodiments.

With reference now to FIG. 3 and FIG. 2, a flow diagram 300 of a method for utilizing a long-life asset tracker 101 for tracking a low mobility asset 103 is shown in accordance with various embodiments. As described herein, low mobility asset 103 may be: a trash bin; a recycle container; a float in a sump, well, septic or other type of fluid containment system; a train car parked in a yard; a car parked in a lot; and the like.

In other examples, low mobility asset 103 may also include, but is not limited to, railways, environmental solutions, lifting solutions, automotive and the like. For example, in railways, long-life asset tracking system 100 may be used to track railcars within the train yard and even improve railcar tracking while the railcars are in transit. Environmental solutions include assets such as lower-cost containers such as smartbins or the like. Lifting solutions may include assets such as crane parts tracking within a "crane yard". Automotive may include assets such as a new car within a "car yard". In general, the car yard may be a manufacturer's parking lot, a dealer's lot, a shipyard lot during shipment of the car, and the like.

Additional examples include asset tracking such as: oil & gas—keeping track of light fixtures, construction—keeping track of tools in a laydown yard, agriculture—keeping track of farm implements, TMW keeping track of truck trailers in a lot, marine—keeping track of boats anchored in a harbor, Forestry—keeping track of trees being cut down and stolen, and the like.

With reference now to 302 of FIG. 3 and FIG. 2, one embodiment receives an activation signal, the signal requesting the long-life asset tracker 101 coupled with the low-mobility asset to activate at least a portion of a position determination system. As shown in 303 of FIG. 3, the position determination system includes radio location module 220 for providing location information at a first level of accuracy. As shown at 304, of FIG. 3, the position determination system also includes NSS module 280 capable of providing location information at a second level of accuracy, where the second level of accuracy is more accurate than the first level of accuracy. In general, NSS module 280 will consume more power in operation to determine the location of long-life asset tracker 101 than is consumed by radio location module 220.

One embodiment receives the activation signal from a network broadcast receiver such as access point 111 of FIG. 1. For example, long-life asset tracker 101 can be contacted via a command from base station 136 via the Cloud or via access point 111. The signal would cause long-life asset tracker 101 to power up and use broad position determiner such as radio-frequency identification (RFID) position determination and the like to provide the first level of location information. If more specific location information was needed, long-life asset tracker 101 can be contacted again to power up the satellite navigation receiver and provide the second level or more precise location information.

In another embodiment, the activation signal is received from timing module 201 at a predefined time interval and/or predefined date/time, either or both of which may be pre-scheduled such as by storage within timing module 201 or transmission from an access point 111 to timing module 201. In other words, timing module 201 may provide time synchronized check in capability. For example, the timing module may be programmed to provide the activation signal once an hour, once a day, once a week, once a month, or the like. In addition, timing module 201 may activate a sleep mode of long-life asset tracker 101 between prescheduled check-ins to reduce the power consumption of long-life asset tracker 101.

In yet another embodiment, the activation signal is generated by accelerometer 203 when motion is detected. For example, the asset would include accelerometer 203 and would power up when accelerometer 203 notes movement. For example, the power-up may be initiated upon notation of any movement by accelerometer 203 and/or upon notation of movement by accelerometer 203 which exceeds a predetermined amount and/or exceeds a predetermined length of time. The position would then be determined to see if asset was moved (and if so, to where) or if an environmental occurrence such as an earthquake has occurred.

With reference now to 306 of FIG. 3 and to FIG. 2, one embodiment defaults to the radio location module 220 to perform position determination without utilizing NSS module 280 to extend the life of a power source of long-life asset tracker 101. For example, one embodiment utilizes radio location module 220 to provide the location of long-life asset tracker 101 at the first level of accuracy. In one embodiment, the first level of accuracy is at least 5 meter accuracy. One embodiment may include a broad position determiner such as an RFID position determination or the like to provide the first level of location information.

With reference now to 308 of FIG. 3, one embodiment broadcasts the location of long-life asset tracker 101 with the first level of accuracy unless a condition has been met to utilize the NSS module 280 and broadcast the location of the long-life asset tracker 101 at the second level of accuracy. Actual broadcasting of the location, is accomplished by information provider module 240, in some embodiments. For example, in one embodiment, activation module 210 may receive a request for the location of the asset with the second level of accuracy. Such a request is one example of a condition being met for activating NSS module 280. When this occurs, activation module 210 signals position determiner 230 to provide a signal to power up NSS module 280 coupled with the long-life asset tracker and utilize NSS module 280 to provide the location of long-life asset tracker 101 at the second level of accuracy. In one embodiment, the second level of accuracy is at least sub-meter accuracy.

In one embodiment, the asset information 250 that is sent may only include a few bits of information when powered up on normal or scheduled reports to conserve battery life. For example, by comparing a presently determined location to a previously stored location (e.g., the last reported location), only the last few bits of the newly determined location which are either the same or are marginally different from the stored location may be reported.

In one embodiment, activation module 210 receives a second activation signal, the second activation signal requesting the long-life asset tracker coupled with the low-mobility asset to activate asset evaluation module 235 and perform an asset metric evaluation.

In general, the asset metric evaluation determines a metric about low mobility asset 103. For example, the metric may be a battery level meter signal. For example, asset evaluation module 235 may send an activation message to activation module 210 if the battery power drops to a certain predefined level. Long-life asset tracker 101 can then send a message to the network and include the metric determined during the asset metric evaluation and/or include information derived from this evaluation. For example, long-life asset tracker 101 can send a message with the battery level meter signal metric to the network to make it known that a battery change is needed.

In another embodiment, asset evaluation module 235 may send an activation message to activation module 210 if a certain boundary level is reached. For example, a fluid storage container such as shown at 103b, of FIG. 4, may receive chemical waste. In addition, activation module 210 may be programmed to send the activation signal when the waste level reaches a predefined fullness level (e.g., 80%). When the threshold is reached, long-life asset tracker 101 will send a message to let the long-life asset tracking system 100 and base station 136 know the level of fluid waste the fluid storage container and the need to schedule a change/drain/etc.

In yet another embodiment, asset evaluation module 235 may send an activation message to activation module 210 if an alarm on the asset is activated. For example, if a chemical alarm, fire alarm, theft sensor alarm, etc. is activated on low mobility asset 103, long-life asset tracker 101 will provide asset information 250 to the long-life asset tracking system 100 and base station 136. In one embodiment, asset information 250 may be a status signal or may be an in depth alert that includes alarm specific information, location of asset, etc. In one embodiment, when the asset information 250 is received by base station 136, a further scan of the database for any other assets located within the general area may be performed. If any assets are recognized, base station 136 may provide power-up information to the other assets in the general area requesting updated location information, any alarm status, an environmental check, and the like.

Figure 4:
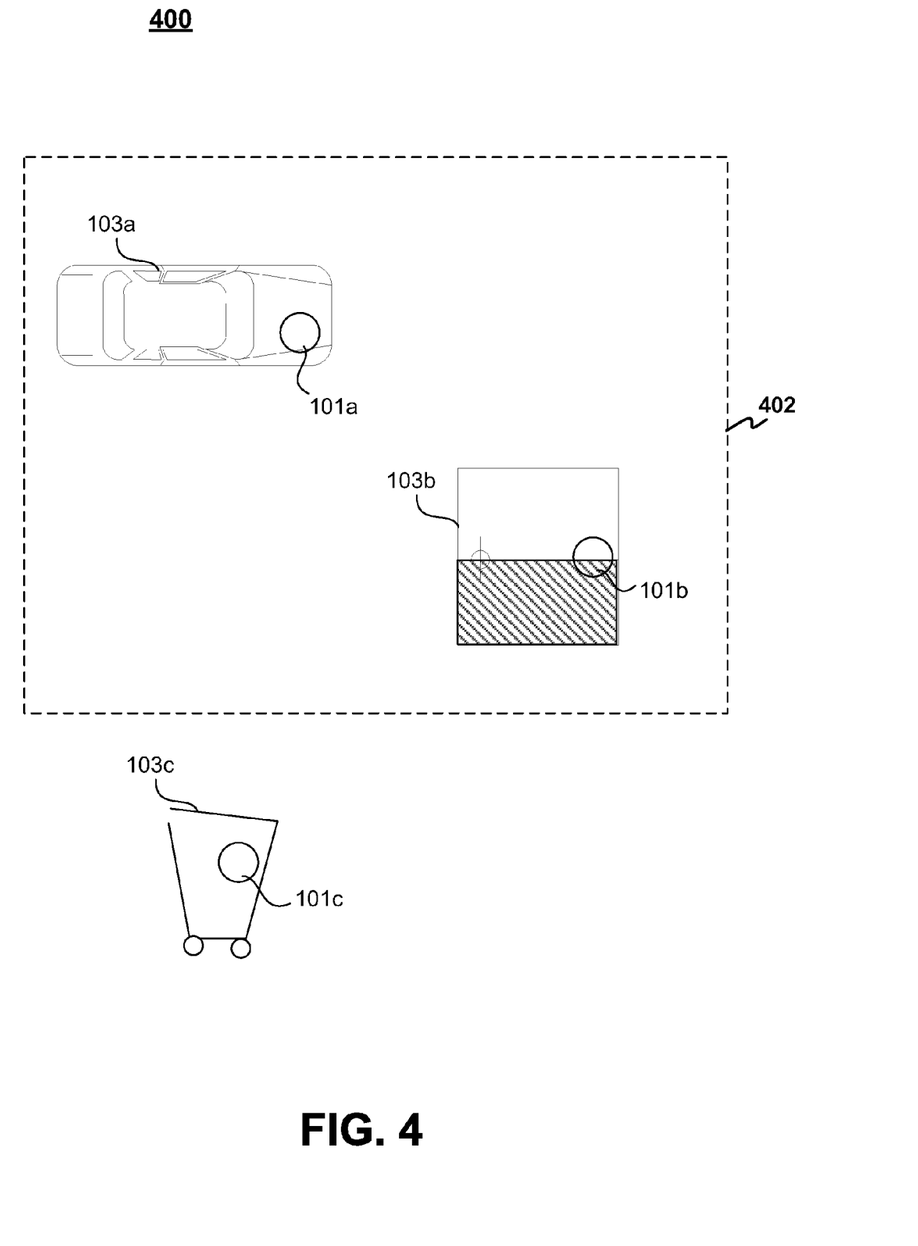
FIG. 4 is a map of a site with a long-life asset tracker for a low mobility asset according to one embodiment of the present technology.

In another embodiment the alarm may be a geofencing alarm such as geofence 402 of FIG. 4. The geofencing alarm may be an active alarm, such as a device specific geofence. For example, if low mobility asset 103c is outside of a geofenced area when the location is determined then the alarm can be activated and the information can be provided to system 100 and base station 136.

In another embodiment, e.g., a passive geofence environment, when long-life asset tracker 101c provides location information to base station 136, base station 136 notes the location of low mobility asset 103c as being outside of a geofence 402 and sends a command to low mobility asset 103c to power up NSS module 280 to provide a finer level of accuracy about the location. In a like manner, other alarms (including those described herein) may also cause a condition to be met for powering up NSS module 280 to provide a finer level of accuracy about the location of a long-life asset tracker 101.

Information provider module 240 then broadcasts the metric about low mobility asset 103 to a monitoring station such as access point 111 which can then provide the information to base station 136 via Cloud 120.

Referring now to FIG. 4, a map 400 of a geofenced site with long-life asset tracker 101a-c for low mobility assets 103a-103c is shown in accordance with various embodiments. In general, FIG. 4 shows a vehicle 103a with long-life asset tracker 101a in the car yard. In addition, a fluid storage container 103b is shown with a fluid level monitored by long-life asset tracker 101b which is floating in the tank. Moreover, a trash bin 103c is also shown with long-life asset tracker 101c. As described herein, trash bin 103c is outside of geofence 402.

NSS Receiver

Figure 5:
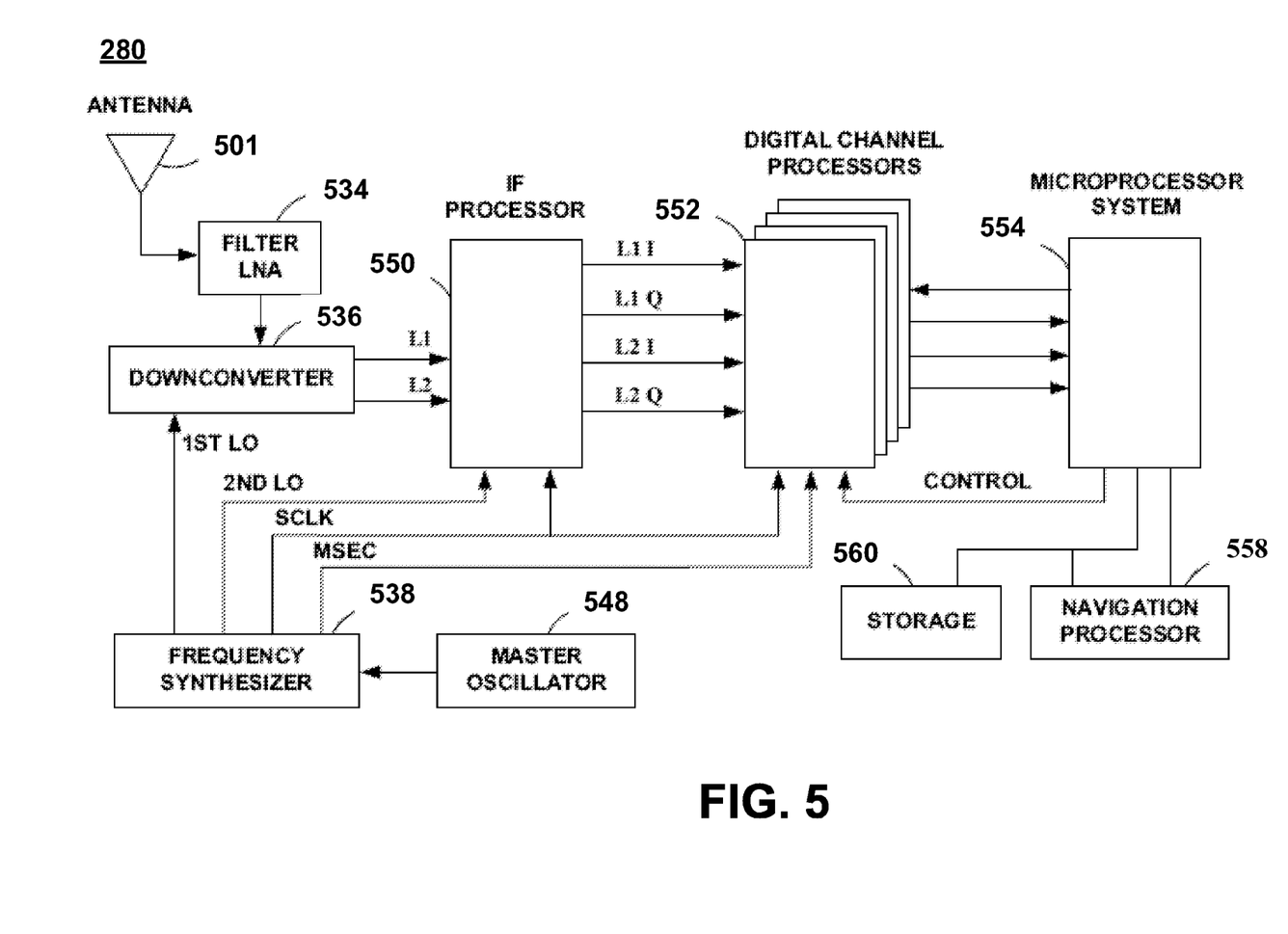
FIG. 5 is a block diagram of an example navigation satellite system (NSS) receiver which may be used in accordance with one embodiment of the present technology.

With reference now to FIG. 5, a block diagram is shown of an embodiment of an example NSS receiver which may be used in accordance with various embodiments described herein. The NSS receiver illustrated in FIG. 5 may be used to perform the functions of NSS module 280, in some embodiments. In particular, FIG. 5 illustrates a block diagram of a NSS module 280 in the form of a general purpose global positioning system (GPS) receiver capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" NSS receivers such as those used in the military and some civilian applications. Typically, the "consumer" grade NSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a NSS receiver and operation with respect to GPS is described herein as one implementation of NSS module 280, implementations of NSS module 280 are well suited for use with numerous other NSS signal(s) including, but not limited to, GPS signal(s), GLONASS signal(s), and Galileo signal(s).

The implementations of NSS module 280 are also well suited for use with regional navigation satellite system signal(s) including, but not limited to, Omnistar signal(s), StarFire signal(s), Centerpoint signal(s), BeiDou Satellite Navigation Experimental System signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, implementations of NSS module 280 may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, implementations of NSS module 280 may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS in an implementation of NSS module 280, the present technology may utilize any of the plurality of different navigation system signal(s). Moreover, the present technology may utilize two or more different types of navigation system signal(s) to generate location information in NSS module 280. Thus, although a GPS operational example is provided herein it is merely for purposes of clarity.

Embodiments of the present technology may be utilized by NSS receivers which access the L1 signals alone, or in combination with the L2 signal(s). A more detailed discussion of the function of a receiver such as GPS receiver can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to the GPS receiver of FIG. 5.

In FIG. 5, received L1 and L2 signal is generated by at least one GPS satellite. Each GPS satellite generates different signal L1 and L2 signals and they are processed by different digital channel processors 552 which operate in the same way as one another. FIG. 5 shows GPS signals (L1=1575.42 MHz, L2=1227.60 MHz) entering the GPS receiver through a dual frequency antenna 501. Antenna 501 may be a magnetically mountable model commercially available from Trimble® Navigation of Sunnyvale, Calif., 94085. Master oscillator 548 provides the reference oscillator which drives all other clocks in the system. Frequency synthesizer 538 takes the output of master oscillator 548 and generates clock and local oscillator frequencies used throughout the system. For example, in one embodiment frequency synthesizer 538 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 534 performs filtering and low noise amplification of both L1 and L2 signals. The noise figure of the GPS receiver is dictated by the performance of the filter/LNA combination. The downconverter 536 mixes both L1 and L2 signals in frequency down to approximately 175 MHz and outputs the analogue L1 and L2 signals into an IF (intermediate frequency) processor 550. IF processor 550 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 552 inputs the digitally sampled L1 and L2 inphase and quadrature signals. All digital channel processors 552 are typically identical by design and typically operate on identical input samples. Each digital channel processor 552 is designed to digitally track the L1 and L2 signals produced by one satellite by tracking code and carrier signals and to form code and carrier phase measurements in conjunction with the microprocessor system 554. One digital channel processor 552 is capable of tracking one satellite in both L1 and L2 channels.

Microprocessor system 554 is a general purpose computing device which facilitates tracking and measurements processes, providing pseudorange and carrier phase measurements for a navigation processor 558. In one embodiment, microprocessor system 554 provides signals to control the operation of one or more digital channel processors 552. Navigation processor 558 performs the higher level function of combining measurements in such a way as to produce position, velocity and time information for the differential and surveying functions. Storage 560 is coupled with navigation processor 558 and microprocessor system 554. It is appreciated that storage 560 may comprise a volatile or nonvolatile storage such as a random access memory (RAM) or read only memory (ROM), or some other computer readable memory device or media.

One example of a GPS chipset upon which embodiments of the present technology may be implemented is the Maxwell™ chipset which is commercially available from Trimble® Navigation of Sunnyvale, Calif., 94085.

Example Computer System Environment

Figure 6:
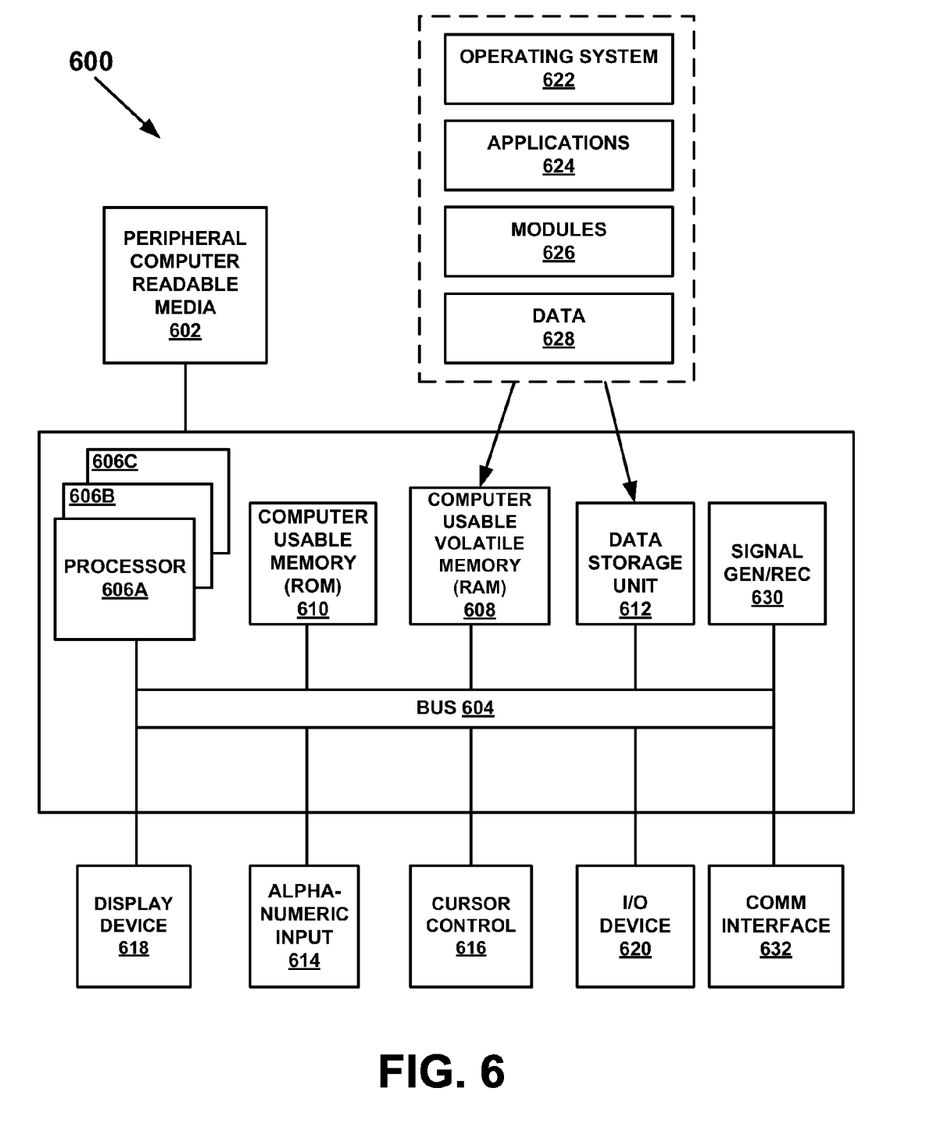
FIG. 6 shows an example computer system according to various embodiments of the present technology.

With reference now to FIG. 6, portions of the technology for long-life asset tracking are composed of computer-readable and computer-executable instructions that reside, for example, in non-transitory computer-usable storage media of a computer system. That is, FIG. 6 illustrates one example of a type of computer that can be used to implement embodiments of the present technology. FIG. 6 represents a system or components that may be used in conjunction with aspects of the present technology. In one embodiment, some or all of the components of FIG. 1 or FIG. 3 may be combined with some or all of the components of FIG. 6 to practice the present technology.

FIG. 6 illustrates an example computer system 600 used in accordance with embodiments of the present technology. It is appreciated that computer system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a floppy disk, a compact disc, a flash drive, and the like coupled thereto.

Computer system 600 of FIG. 6 includes an address/data/control bus 604 for communicating information, and a processor 606A coupled to bus 604 for processing information and instructions. As depicted in FIG. 6, computer system 600 is also well suited to a multi-processor environment in which a plurality of processors 606A, 606B, and 606C are present. Conversely, computer system 600 is also well suited to having a single processor such as, for example, processor 606A. Processors 606A, 606B, and 606C may be any of various types of microprocessors. Computer system 600 also includes data storage features such as a computer usable volatile memory 608, e.g., random access memory (RAM), coupled to bus 604 for storing information and instructions for processors 606A, 606B, and 606C.

Computer system 600 also includes computer usable non-volatile memory 610, e.g., read only memory (ROM), coupled to bus 604 for storing static information and instructions for processors 606A, 606B, and 606C. Also present in computer system 600 is a data storage unit 612 (e.g., a magnetic or optical disk and disk drive) coupled to bus 604 for storing information and instructions. Computer system 600 also includes an optional alpha-numeric input device 614 including alphanumeric and function keys coupled to bus 604 for communicating information and command selections to processor 606A or processors 606A, 606B, and 606C. Computer system 600 also includes an optional cursor control device 616 coupled to bus 604 for communicating user input information and command selections to processor 606A or processors 606A, 606B, and 606C. Computer system 600 of the present embodiment also includes an optional display device 618 coupled to bus 604 for displaying information.

Referring still to FIG. 6, optional display device 618 of FIG. 6 may be a liquid crystal device, cathode ray tube, OLED, plasma display device or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick or special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

Computer system 600 is also well suited to having a cursor directed by other means such as, for example, voice commands, touch screen, non-contact gesture input, and the like. Computer system 600 also includes an I/O device 620 for coupling computer system 600 with external entities. For example, in one embodiment, I/O device 620 is a modem for enabling wired or wireless communications between computer system 600 and an external network such as, but not limited to, the Internet or intranet. A more detailed discussion of the present technology is found below.

Referring still to FIG. 6, various other components are depicted for computer system 600. Specifically, when present, an operating system 622, applications 624, modules 626, and data 628 are shown as typically residing in one or some combination of computer usable volatile memory 608, e.g., random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the internet. In one embodiment, the present technology, for example, is stored as an application 624 or module 626 in memory locations within computer usable volatile memory 608 and memory areas within data storage unit 612. The present technology may be applied to one or more elements of described computer system 600.

Computer system 600 also includes one or more signal generating and receiving device(s) 630 coupled with bus 604 for enabling computer system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from computer system 600. Communication interface 632 may include a serial port, parallel port, Universal Serial Bus (USB), Ethernet port, short-range wireless personal area network communications (e.g., Bluetooth), thunderbolt, near field communications port, WiFi, Cellular modem, or other input/output interface. Communication interface 632 may physically, electrically, optically, or wirelessly (e.g., via radio frequency) couple computer system 600 with another device, such as a cellular telephone, radio, or computer system.

The computer system 600 is only one example of a suitable computing environment and is not intended to suggest any limitation as to the scope of use or functionality of the present technology. Neither should the computing environment such as computer system 600 be interpreted as having any dependency or requirement relating to any one or combination of components illustrated in the example computer system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for utilizing a long-life asset tracker for tracking a low-mobility asset, the method comprising:
   receiving an activation signal, the activation signal requesting the long-life asset tracker coupled with the low-mobility asset to activate at least a portion of a position determination system, the position determination system comprising:
   a radio location module providing location information at a first level of accuracy; and
   a navigation satellite system (NSS) circuitry providing location information at a second level of accuracy, wherein the second level of accuracy is more accurate than the first level of accuracy, the NSS module consuming more power in operation to determine the location of the long-life asset tracker than is consumed by the radio location module;
   defaulting to the radio location module to perform position determination without utilizing the NSS module to extend the life of a power source of the long-life asset tracker;
   broadcasting the location of the long-life asset tracker with the first level of accuracy unless a condition has been met to utilize the NSS module and broadcast the location of the long-life asset tracker at the second level of accuracy;
   receiving a second activation signal, the second activation signal requesting the long-life asset tracker coupled with the low-mobility asset to perform an asset metric evaluation;
   performing the asset metric evaluation with the long-life asset tracker to determine a metric about the low-mobility asset; and
   broadcasting the metric about the low-mobility asset to a monitoring station.

2. The method of claim 1 wherein receiving the activation signal comprises:
   receiving the activation signal from a network broadcast receiver.

3. The method of claim 1 wherein receiving the activation signal comprises:
   receiving the activation signal from a timing module at a predefined time interval.

4. The method of claim 1 wherein receiving the activation signal comprises:
   receiving the activation signal from an accelerometer when motion is detected by the accelerometer.

5. The method of claim 1 wherein the first level of accuracy is at least a 5 meter accuracy.

6. The method of claim 1 further comprising:
   operating the radio locator in a 902-928 megahertz range.

7. The method of claim 6 wherein the second level of accuracy is at least a sub-meter accuracy.

* * * * *